United States Patent
Roy et al.

(10) Patent No.: US 9,420,558 B2
(45) Date of Patent: *Aug. 16, 2016

(54) HYBRID LAND MOBILE RADIO SYSTEM INCORPORATING MOBILITY MANAGEMENT AND OUT-OF-COVERAGE INDICATION

(71) Applicant: E.F. Johnson Company, Irving, TX (US)

(72) Inventors: Arindam Roy, Plano, TX (US); Linda Trine, Keller, TX (US); Marshall Jobe, Fort Worth, TX (US)

(73) Assignee: E.F. Johnson Company, Irving, TX (US)

( * ) Notice: Subject to any disclaimer, the term of this patent is extended or adjusted under 35 U.S.C. 154(b) by 66 days.

This patent is subject to a terminal disclaimer.

(21) Appl. No.: 14/230,476

(22) Filed: Mar. 31, 2014

(65) Prior Publication Data
US 2014/0211650 A1    Jul. 31, 2014

Related U.S. Application Data

(63) Continuation of application No. 13/210,211, filed on Aug. 15, 2011, now Pat. No. 8,699,369.

(60) Provisional application No. 61/373,811, filed on Aug. 14, 2010.

(51) Int. Cl.
*H04W 64/00* (2009.01)
*H04W 4/10* (2009.01)
(Continued)

(52) U.S. Cl.
CPC ............... *H04W 64/00* (2013.01); *H04W 4/10* (2013.01); *H04W 24/00* (2013.01); *H04W 76/005* (2013.01); *H04W 84/08* (2013.01)

(58) Field of Classification Search
CPC ....... H04W 24/00; H04W 4/10; H04W 64/00; H04W 76/005; H04W 84/08
USPC .......................................... 370/229, 235, 237
See application file for complete search history.

(56) References Cited

U.S. PATENT DOCUMENTS 5,159,596 A    10/1992 Itoh
5,528,597 A    6/1996 Gerszberg et al.
(Continued)

OTHER PUBLICATIONS co-pending U.S. Appl. No. 13/174,507 filed Jun. 30, 2011; inventor: Roy et al. (stored in USPTO's IFW system).
(Continued)

*Primary Examiner* — Chi H Pham
*Assistant Examiner* — Robert Lopata
(74) *Attorney, Agent, or Firm* — Gardere Wynne Sewell L.L.P.

(57) ABSTRACT

The present disclosure provides a system and a method for providing mobility management and out-of-coverage indication in a hybrid system comprised of conventional LMR sites and trunking LMR sites. If a radio is located at a conventional site, the radio provides its location and user group data to the disclosed system through its traffic channel when the channel is idle. If the radio is located at a trunking site, the radio provides its location and user group data to the disclosed system through the trunking site's control channel. Knowledge of the radio's current location and user group data is used to provide dynamic call routing and data management within the disclosed system. The disclosed system and method provides seamless communication between a trunking site and a conventional site while concurrently enhancing the hybrid system to provide mobility management and out-of-coverage indication features typically associated with a stand-alone trunking system.

22 Claims, 7 Drawing Sheets

(51) Int. Cl.
*H04W 76/00* (2009.01)
*H04W 84/08* (2009.01)
*H04W 24/00* (2009.01)

(56) References Cited

U.S. PATENT DOCUMENTS

| | | | |
|---|---|---|---|
| 5,592,534 A | 1/1997 | Ito | |
| 5,946,305 A | 8/1999 | Fukuda | |
| 5,970,417 A * | 10/1999 | Toyryla et al. | 455/519 |
| 6,161,016 A | 12/2000 | Yarwood | |
| 7,596,194 B2 * | 9/2009 | Janky | 375/346 |
| 7,889,846 B2 | 2/2011 | Beard et al. | |
| 8,094,563 B2 * | 1/2012 | Roy et al. | 370/237 |
| 8,126,494 B2 | 2/2012 | Shaffer et al. | |
| 8,699,369 B2 | 4/2014 | Roy et al. | |
| 8,774,093 B2 | 7/2014 | Roy et al. | |
| 2002/0037715 A1 * | 3/2002 | Mauney et al. | 455/421 |
| 2004/0015548 A1 | 1/2004 | Lee | |
| 2004/0176148 A1 | 9/2004 | Morimoto | |
| 2005/0007992 A1 | 1/2005 | Phu | |
| 2005/0037794 A1 * | 2/2005 | Namm et al. | 455/519 |
| 2005/0090262 A1 | 4/2005 | Hamano et al. | |
| 2005/0277383 A1 | 12/2005 | Reid | |
| 2006/0063544 A1 | 3/2006 | Zhao et al. | |
| 2007/0072554 A1 | 3/2007 | Janky | |
| 2007/0287379 A1 | 12/2007 | Matsuura et al. | |
| 2008/0117876 A1 | 5/2008 | Hidaka et al. | |
| 2008/0207260 A1 | 8/2008 | Dent | |
| 2009/0175209 A1 | 7/2009 | Roy et al. | |
| 2010/0105381 A1 | 4/2010 | Takeda | |
| 2010/0177661 A1 | 7/2010 | Dailey | |
| 2011/0103393 A1 | 5/2011 | Meier et al. | |
| 2011/0263288 A1 * | 10/2011 | Korus et al. | 455/518 |
| 2011/0292870 A1 | 12/2011 | Nagpal et al. | |
| 2012/0002588 A1 | 1/2012 | Roy et al. | |
| 2012/0039201 A1 | 2/2012 | Roy et al. | |
| 2014/0308949 A1 | 10/2014 | Roy et al. | |

OTHER PUBLICATIONS

U.S. Appl. No. 14/325,332; Office Action dated Feb. 12, 2015.
U.S. Appl. No. 14/325,332; Terminal Disclaimer filed Jul. 13, 2015.
U.S. Appl. No. 14/325,332; Response to Non-Final Office Action dated Jul. 13, 2015.
U.S. Appl. No. 14/325,332; Office Action dated Oct. 5, 2015.
U.S. Appl. No. 14/325,332; Request for Continued Examination dated Mar. 7, 2016.
U.S. Appl. No. 14/325,332; Response to Final Office Action dated Mar. 7, 2016.
U.S. Appl. No. 14/325,332; Non-Final Office Action dated Jun. 17, 2016.

* cited by examiner

HYBRID LAND MOBILE RADIO SYSTEM INCORPORATING MOBILITY MANAGEMENT AND OUT-OF-COVERAGE INDICATION

CROSS-REFERENCE TO RELATED APPLICATIONS

Pursuant to 35 U.S.C. §120, this application is a continuation of U.S. patent application Ser. No. 13/210,211, entitled "Hybrid Land Mobile Radio System Incorporating Mobility Management and Out-of-Coverage Indication," filed Aug. 15, 2011, and naming Arindam Roy, Linda Trine, and Marshall Jobe as inventors, which claims priority from U.S. Provisional Patent Application Ser. No. 61/373,811, entitled "Hybrid Land Mobile Radio System Incorporating Mobility Management and Out-of-Coverage Indication," filed Aug. 14, 2010, and naming Arindam Roy, Linda Trine, and Marshall Jobe as inventors, all of which are hereby incorporated by reference for all purposes.

TECHNICAL FIELD

The present invention relates generally to Land Mobile Radio (LMR) systems and, more specifically, to a hybrid land mobile radio system incorporating mobility management and out-of-coverage indication.

BACKGROUND

Land Mobile Radio (LMR) systems are deployed by organizations requiring instant communication between geographically dispersed and mobile personnel. Typical users of LMR systems include police departments, fire departments, medical personnel, security personnel, EMS, and the military.

Current LMR systems can be configured to provide for radio communications between one or more sites and subscriber radio units in the field. A subscriber radio unit (hereinafter "radio") may be a mobile unit or a portable unit. LMR systems can be as simple as two radio units communicating between themselves over preset channels, or they can be complex systems that include hundreds of radio units and one or more sites.

LMR systems can be broadly divided into three classes: (1) trunking LMR systems; (2) conventional LMR systems; and (3) hybrid LMR systems. A trunking system generally includes one or more trunking sites and dispatch control centers. FIG. 1 illustrates a typical trunking LMR system 100 including a trunking site 104 and a dispatcher 108. The trunking site 104 includes a control channel 112 and one or more traffic channels (e.g., 116, 118). Typically a group of radio users (e.g., 124, 128) create a user group to communicate with each other and the dispatcher 108. In a trunking system 100 there can be multiple radio users and multiple user groups.

Trunking systems streamline usage of Radio Frequency (RF) resources (e.g., traffic channels) through the use of mobility management. Mobility management allows the system to send periodic messages to the radios through a dedicated radio frequency base station, also known as a control channel, while the radios communicate back with the system. The periodic messages may indicate coverage availability, signal strength, and other data to the radio, while communication from the radio may indicate to the system the radio's location and interested user group. If the radio stops receiving the messages from the control channel 112, the radio notifies the user, typically through visual and audible indicators, that the radio is outside of the coverage zone of the trunking system.

Mobility management allows dynamic routing of "Push-to-Talk" user group calls based on user availability in different geographic locations. Therefore, trunking systems implement mobility management to allow a radio unit to move from one geographic region to another while the system keeps track of the unit's location and user group affiliation within the unit's current geographic region. When a radio user wants to contact other radio users or a dispatcher in the same user group, the radio user sends a request to a trunking site controller 132 through the control channel 112. The trunking site controller 132 contacts the other trunking sites interested in the same user group. The trunking site controller in each interested site allocates an available traffic channel. Once a channel is available, the radio users in the user group are notified through the control channel, and their radios are placed in communication with the appropriate traffic channel to communicate with each other. Since a traffic channel is allocated dynamically on a per call basis, a trunking system provides efficient utilization of available bandwidth and RF resources.

Although trunking systems provide efficient usage of RF resources, it is achieved at significant costs. Specifically, the control channel required to provide communication of user location from the radios to the system is expensive. When cost is of concern, a conventional LMR system may be a preferred solution since the conventional system lacks the expensive control channel.

A conventional system allows the radio users to directly access a traffic channel, if available, and originate voice communication. FIG. 2 illustrates a conventional LMR system 200. Like the trunking system 100, the conventional LMR system 200 may include one or more conventional sites, although only one conventional site 204 and dispatcher 208 is shown in FIG. 2. However, unlike the trunking site 104, the conventional site 204 does not include a control channel. The conventional site 204 includes one or more traffic channels (e.g., 216, 220 and 224) each traffic channel being typically assigned to one or more user groups for use by radios, such as radio 228 and radio 232. The members of a user group may communicate with each other on the same traffic channel, thus allowing the users and the dispatcher to instantly communicate with each other without waiting for the system to allocate a traffic channel.

Although a conventional system may be more economical than a trunking system, one of its disadvantages is that absence of a control channel precludes the system from sending periodic coverage indication messages to the radios, and the radios are unable to inform the system of its location or interested user group—features typically associated with mobility management as discussed above. Therefore, the system is unable to intelligently route originating traffic to select destination sites based on user availability, and the radio is unable to indicate to the user that the radio is outside of the coverage zone of the conventional system. As a result, a conventional system implements preconfigured routing to route a call from the originating radio to a fixed set of geographic locations, regardless of user availability in those sites. Accordingly, RF resources are typically wasted or inefficiently allocated when a user is not available in a site. While a conventional system may provide an initial lower cost LMR system solution, the lack of mobility-based routing and out-of-coverage indication limits the usage of the system.

Both the trunking system 100 and the conventional system 200 allow the mobile users to communicate via the traffic channel within their respective user groups. For example, radios 124 and 128 in the trunking system 100 can communicate within their specific user group over a traffic channel assigned on a per call basis. Likewise, the radios 228 and 232 in the conventional system 200 can communicate within their specific user groups over a traffic channel. However, if a radio of a specific user group from a trunking system needs to communicate with the same user group from a conventional LMR system, the dispatcher must patch the call to enable the two similar user groups to communicate. Since the dispatcher needs to patch the call to allow the radio from the trunking system to communicate with the radio from the conventional system, the reliability of such communication is degraded due to the reliance on the dispatcher.

A hybrid LMR system may be provided to integrate trunking systems and conventional systems thereby allowing communication between radios operating within the two systems. The hybrid system improves the reliability of communication between a radio operating on a trunking system (or at a trunking site) and a radio operating on a conventional system (or at a conventional site) by eliminating reliance upon a dispatcher to connect the radios to a call. Accordingly, a hybrid system enables seamless communication between a trunking system and a conventional system.

Although the hybrid system incorporates both trunking and conventional systems, features typically achieved through the trunking system such as, for example, mobility management and out-of-coverage indication, are not universally maintained in a hybrid system since those features are not typically compatible with the conventional system component. Accordingly, while a hybrid system may provide convenience and economical benefits, many features that are attractive to stand-alone LMR systems (i.e., trunking systems and conventional systems) may not be supported in standard hybrid systems.

SUMMARY

The present disclosure provides a system and method for providing mobility management and out-of-coverage indication in a hybrid LMR system, thus maintaining seamless communication between a trunking site radio and a conventional site radio, while concurrently enhancing the hybrid system to provide mobility management features typically associated with a stand-alone trunking system.

The foregoing and other features and advantages of certain embodiments of the present disclosure will become further apparent from the following detailed description of the embodiments, read in conjunction with the accompanying drawings. The detailed description and drawings are merely illustrative of the disclosure, rather than limiting the scope of the invention as defined by the appended claims and equivalents thereof.

BRIEF DESCRIPTION OF THE DRAWINGS

Embodiments are illustrated by way of example in the accompanying figures, in which like reference numbers indicate similar parts, and in which.

DETAILED DESCRIPTION OF THE DRAWINGS

The present disclosure provides a system and a method for providing mobility management and out-of-coverage indication in a hybrid LMR system. The disclosed system and method maintains seamless communication between trunking sites and conventional sites while concurrently enhancing the hybrid system to provide mobility management and out-of-coverage indication features typically associated with a stand-alone trunking system.

Figure 1:
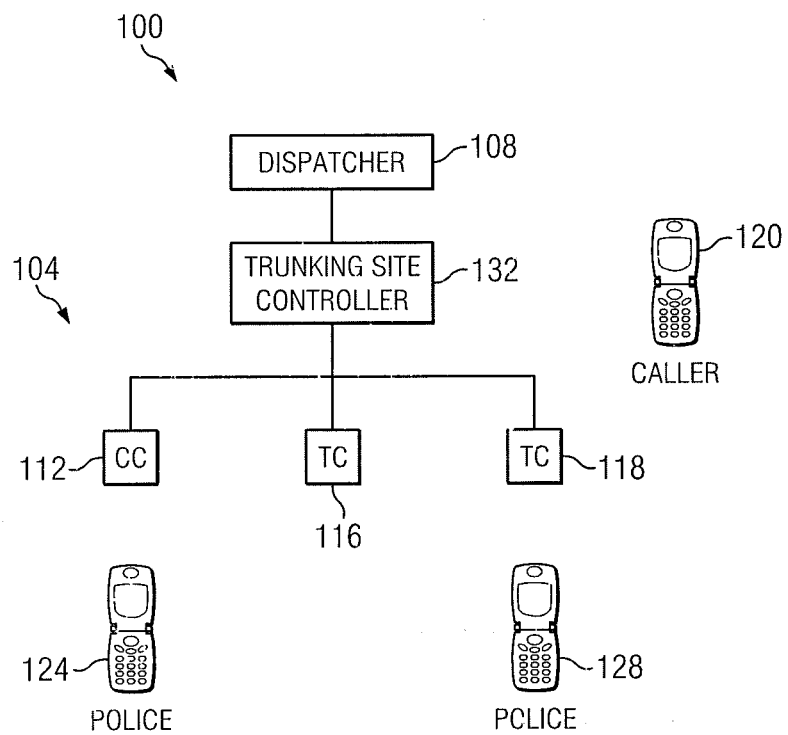
FIG. 1 is an illustration of an exemplary trunking LMR system.
Figure 2:
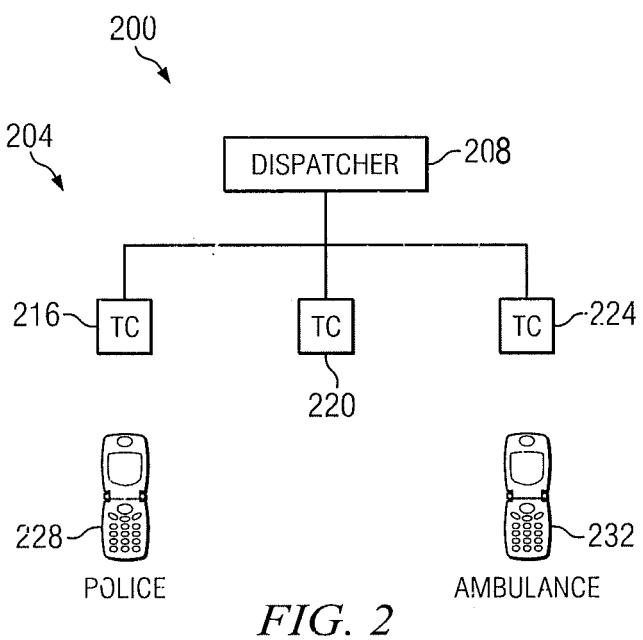
FIG. 2 is an illustration of an exemplary conventional LMR system.
Figure 3:
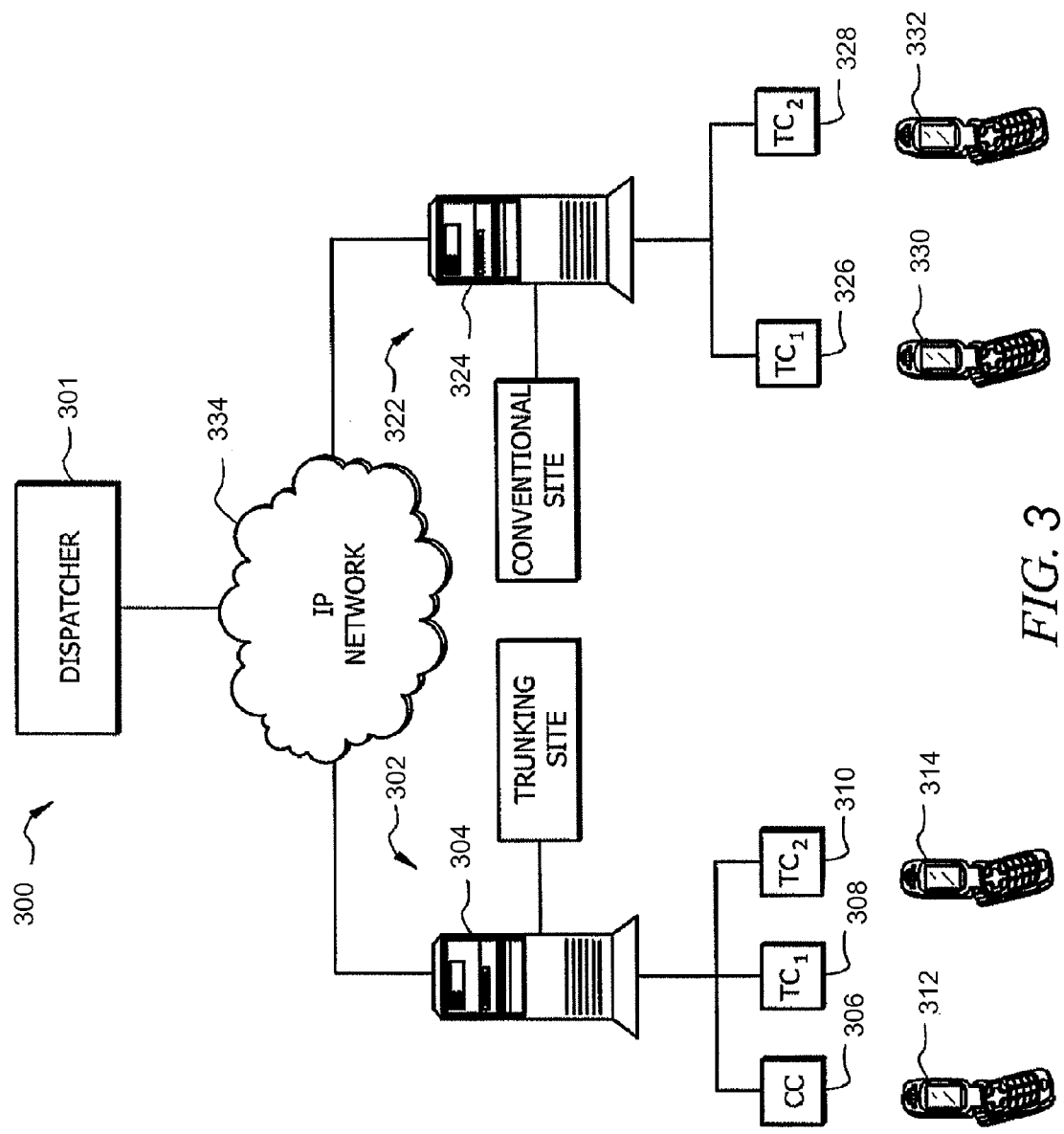
FIG. 3 is an illustration of an exemplary hybrid LMR system.

An example hybrid system 300 that may be used in accordance with the present disclosure is provided in FIG. 3 and described in greater detail in U.S. patent application Ser. No. 12/171,445, which is incorporated herein by reference. The exemplary hybrid system 300 includes a dispatcher 301, a trunking site 302, and a conventional site 322. The elements associated with the trunking site 302 may include a trunking site controller 304, at least one trunking control channel 306, and a plurality of trunking traffic channels 308 and 310. In an embodiment of the present disclosure, the trunking site controller 304 may comprise a network gateway router. The trunking control channel 306 is configured to enable communication among the trunking site controller 304 and one or more radios 312 and 314. The trunking traffic channels 308 and 310 each are assigned to a specific trunking site user group by the trunking site controller 304 on a call-by-call basis to enable the trunking site radios 312 and 314 to communicate. The trunking site controller 304 uses the trunking control channel 306 to allocate the trunking traffic channels 308 and 310 among the trunking radios 312 and 314.

The elements associated with the conventional site 322 may include a conventional site controller 324 and a plurality of conventional traffic channels 326 and 328. In an embodiment of the present disclosure, the conventional site controller 324 may comprise a network gateway router. The conventional traffic channels 326 and 328 are each assigned to one or more specific conventional site user groups by the conventional site controller 324 to enable conventional site radios 330 and 332 to communicate. The conventional site controller 324 packetizes voice signals originating from the conventional site radios 330 and 332 into conventional site data packets and routes the conventional site data packets to the trunking site controller 304 over an IP network 334. The trunking site controller 304 routes the conventional site data packets to the intended trunking site radios 312 and 314. Similarly, the trunking site controller 304 packetizes voice signals originating from trunking site radios 312 and 314 into trunking site data packets and routes the trunking site data packets to the conventional site controller 324 over the IP network 334. The conventional site controller 324 routes the trunking site data packets to the intended conventional site radios 330 and 332.

Figure 4:
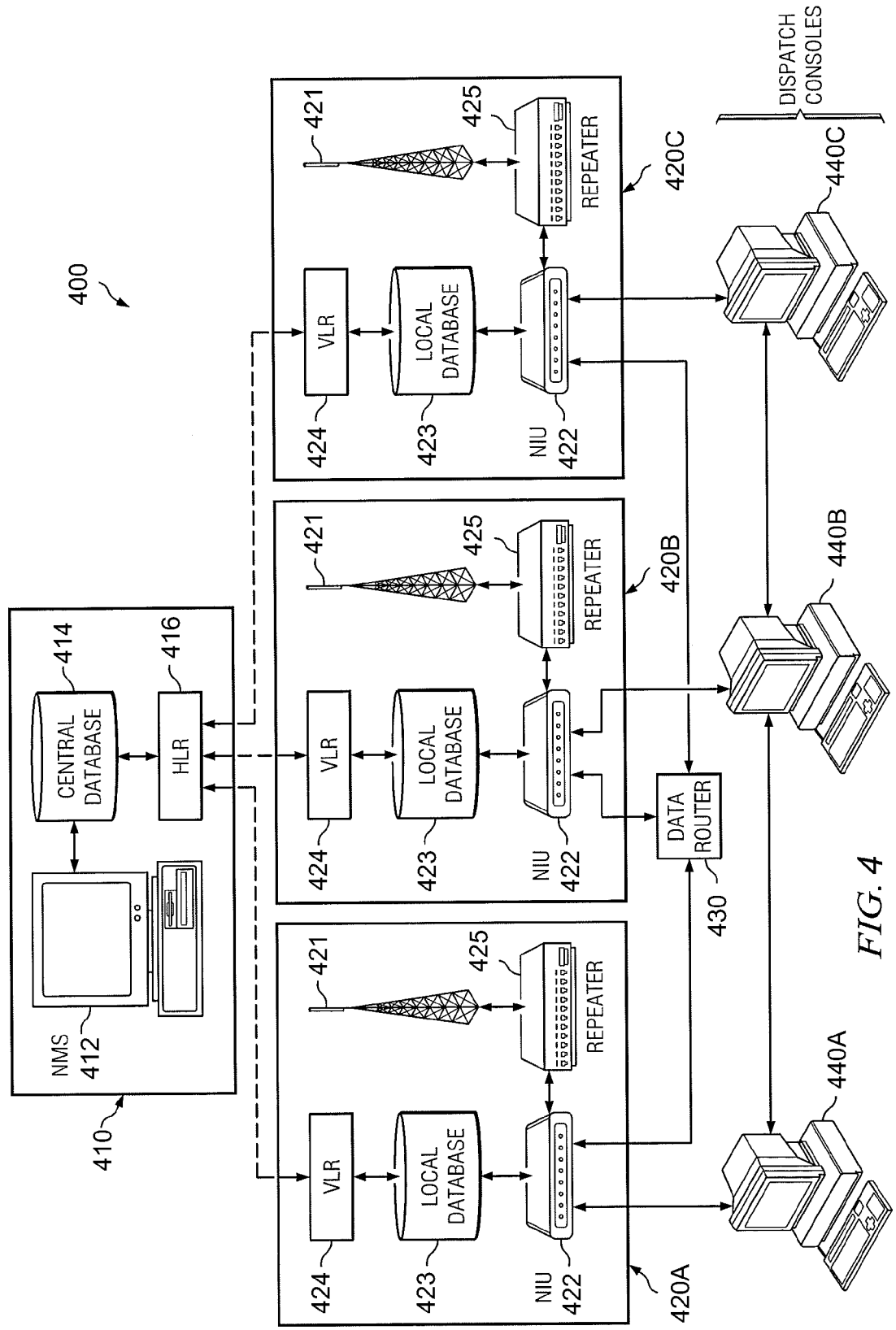
FIG. 4 is a general illustration of an exemplary embodiment of the disclosed system.

FIG. 4 provides an overview of an exemplary embodiment of the system 400 disclosed herein. The exemplary system 400 provided in FIG. 4 illustrates a hybrid LMR system 400 similar to that illustrated in FIG. 3. The hybrid system 400 includes a plurality of hybrid sites 420A, 420B, and 420C, wherein each hybrid site 420A-420C may be either a trunking site or a conventional site. Although some of the components of FIG. 3, such as the radios and control and traffic channels, are not illustrated in FIG. 4, they may still be located at, or in communication with, a hybrid site 420A-420C, depending on whether the specific hybrid site 420A-420C is a conventional site or a trunking site. In addition to the hybrid sites 420A-420C, the hybrid system 400 includes a home location 410, a data router 430, and dispatch consoles 440A, 440B, and 440C.

When reference is made herein to a generic hybrid site or to all the hybrid sites, reference number 420 may be used; otherwise, when reference is made to a specific hybrid site, the corresponding hybrid site reference number (e.g. 420A, 420B, or 420C) may be used. A hybrid site 420 may be referred to herein as a "site;" therefore, unless stated otherwise, all references to the term "site" should be interpreted as a hybrid site, wherein the hybrid site may be either a conventional site or a trunking site. Additionally, the term "local site" may be used herein to reference a single site of interest without defining the site of interest as a particular site; and the term "remote site" may be used to refer to a site other than the local site. When reference is made to a generic dispatch console or to all the dispatch consoles, reference number 440 may be used; otherwise, when reference is made to a specific dispatch console, the corresponding dispatch console reference number (e.g., 440A, 440B, or 440C) may be used. Although FIG. 4 only shows three sites 420 and dispatch consoles 440, it should be understood that the system 400 may accommodate a lesser or greater number of sites 420 and dispatch consoles 440, wherein the collection of sites 420 in the system 400 may include any combination of trunking and conventional sites.

In an embodiment of the present disclosure, the home location 410 may include a network management system (NMS) 412, central database 414 and home location register (HLR) 416. In general, the NMS 412 supports system-wide configuration of all components in the system 400, as well as statistics tracking, alarm tracking, and other system management functionality; the central database 414 stores data; and the HLR 416 works together with a visitor location register (VLR) located at, in communication with, or otherwise assigned to each site 420 to track user group data and the location of all radios in the system 400. In some embodiments, the central database 414 may be combined, partitioned or associated with the NMS 412 and/or HLR 416.

Each site 420 handles communications with and between radios and the system 400. In an embodiment of the present disclosure, each site 420 may include a radio tower 421, a site controller 422, a local database 423, a VLR 424, and a repeater 425 such as, for example, the 2600 Series Repeater manufactured by EF Johnson. The repeater 425, in this embodiment, receives and transmits digital and/or analog signals between a local site 420 and radios (not shown in FIG. 4) in communication with the local site 420. The radio tower 421 provides a communication medium between the repeater 425 and radios in communication with the respective site 420. Although it is not shown in FIG. 4, the site controller 422 may house one or more site applications (e.g., site controller application, channel controller application, inter-site router application, and 2/4-wire interface application). The site controller 422 and its internal applications perform radio and user group validation functions as well as coordinate inter-site calls between radios and/or calls between 2 or 4-wire devices such as, for example, tone remotes or analog repeaters. Although the VLR 424 and local database 423 may reside within the site controller 422, they are shown separately in FIG. 4 (and in following figures) in order to better illustrate the specific components in the system 400 involved in mobility management. Additionally, each site 420 is shown to have its own site controller 422, VLR 424 and local database 423 in FIG. 4; however, in other embodiments, multiple sites 420 may share a single site controller 422, VLR 424 and local database 423.

The data router 430 is operable to communicate with the site controller 422 of one or more of the sites 420 to track the location of a radio, and route data between components of the system 400. In some embodiments, the radio location may be considered to be the site to which the radio is communicating, a geographical location, coordinate data such as that provided by a Global Positioning System (GPS), or some combination thereof. The dispatch consoles 440 are operable to communicate with their respective sites 420 and other dispatch consoles 440 to determine whether radios belonging to a specific user group are located at a particular site 420, and to direct communication between each of the sites 420. Although, in some embodiments, data may be routed to components within the system 400 by the data router 430, in other embodiments, this functionality may be provided by other components such as, for example, the HLR 416.

Typically, a radio is considered to be within coverage of the system 400 when it is operable to communicate with one or more of the sites 420 in the system 400. Although a radio may be outside the coverage zone (i.e., communication range) of a particular site 420, it may still be considered within coverage of the system 400 as long as the radio is within coverage of (i.e., in communication with) at least one of the other sites 420 in the system 400. A radio within coverage is operable to communicate with the system 400 and other radios, whereas a radio out-of-coverage is unable to communicate with the system 400 and other radios. In accordance with an embodiment of the present disclosure, a radio operating within the disclosed system 400 may provide an audible, visual, physical (e.g., vibration), or some other out-of-coverage indication to alert the user that the radio is outside the coverage zone of the system 400, regardless of whether the site 420 in which the radio is located is a conventional site or a trunking site.

In accordance with the present disclosure, when a specific component corresponding to a specific site 420 is referenced, the component may be referenced according to the specific site 420 in which the component is located by appending the letter associated with the specific site to the component's generic reference number. For example, the generic reference number for a local database is "423." If reference is made to the local database of site 420A, the local database may be referenced as "423A." Accordingly, if reference is made to the local databases of sites 420B and 420C specifically, the local databases may be referenced as "423B" and "423C," respectively. Unless indicated otherwise, when a component is referenced by its generic reference number, it should be understood that the reference may include all, or any one, of the components located within the system 400. For example, in accordance with the previous example, if a local database is referenced by the numeral "423," it should be understood that the reference may include any one, or all, of the local databases in the system 400.

In an embodiment of the present disclosure, the NMS 412 of the home location 410 controls configuration of the hybrid system 400. To implement mobility management within the system 400, the NMS 412, in one embodiment, pre-configures all radios operating on the system 400 as well as user group data in the central database 414. The NMS 412 generates radio registration data comprised of a listing of radios that are registered with the system 400 and the user groups that are affiliated with each of the radios. Accordingly, in some embodiments, a site 420 may allow calls to be placed or received by a radio that is configured with the system 400.

Registration of radios that are configured to operate within the system 400 may occur in response to a registration event. In some embodiments, a radio may be considered to be registered to the system 400, or more particularly, to a site 420. A registration event may occur automatically when a configured radio enters communication range of a site 420, or when the registration event is initiated by the radio. A radio may be registered at a particular site 420 when the radio is turned on while within range of the site 420, or when a radio previously out-of-coverage of the site 420 comes within range of the site 420 so that it is then within coverage. A registration event initiated by a radio may include data registration activities such as, for example, power-on/off of the radio and changing the radio channel or user group.

The radio registration data may be changed dynamically by the system 400 to add and/or remove radios from the system 400 and to change the user group affiliated with a radio. In the present disclosure, radios that are affiliated with a particular user group may be referred to as "belonging to," being "affiliated with," or being a "member of" that particular user group. It should be understood that, in some embodiments, some radios may not be affiliated with a user group, but may still be operable to scan, or listen to, one or more user groups.

The NMS 412 generates user group data, wherein the user group data may be comprised of a listing of normal user groups, critical user groups, a priority level for each normal and critical user group, and sites for which the normal and critical user groups are enabled. Accordingly, a site 420 may allow calls to be placed to user groups that are configured with the system 400 and enabled in the site 420.

The NMS 412 also generates critical user group data designating specific sites 420 in which a critical user group is enabled, and a period of time for which they are enabled. The user group data and critical user group data may be changed dynamically by the NMS 412, in some embodiments. For example, the user group data and critical user group data may be changed to add/remove a user group, to select the designation of a user group to be critical or normal, to set/adjust the period of time for which a user group is designated as critical or normal, to set/adjust the priority level of a user group, to set/change the sites enabling a user group, or to set/adjust the period of time for which a critical user group is enabled in a particular site 420. In some embodiments, the radio registration data, user group data and critical user group data may be stored in at least one of the local database 423 of each site 420 in the system 400 or the central database 414.

Figure 5:
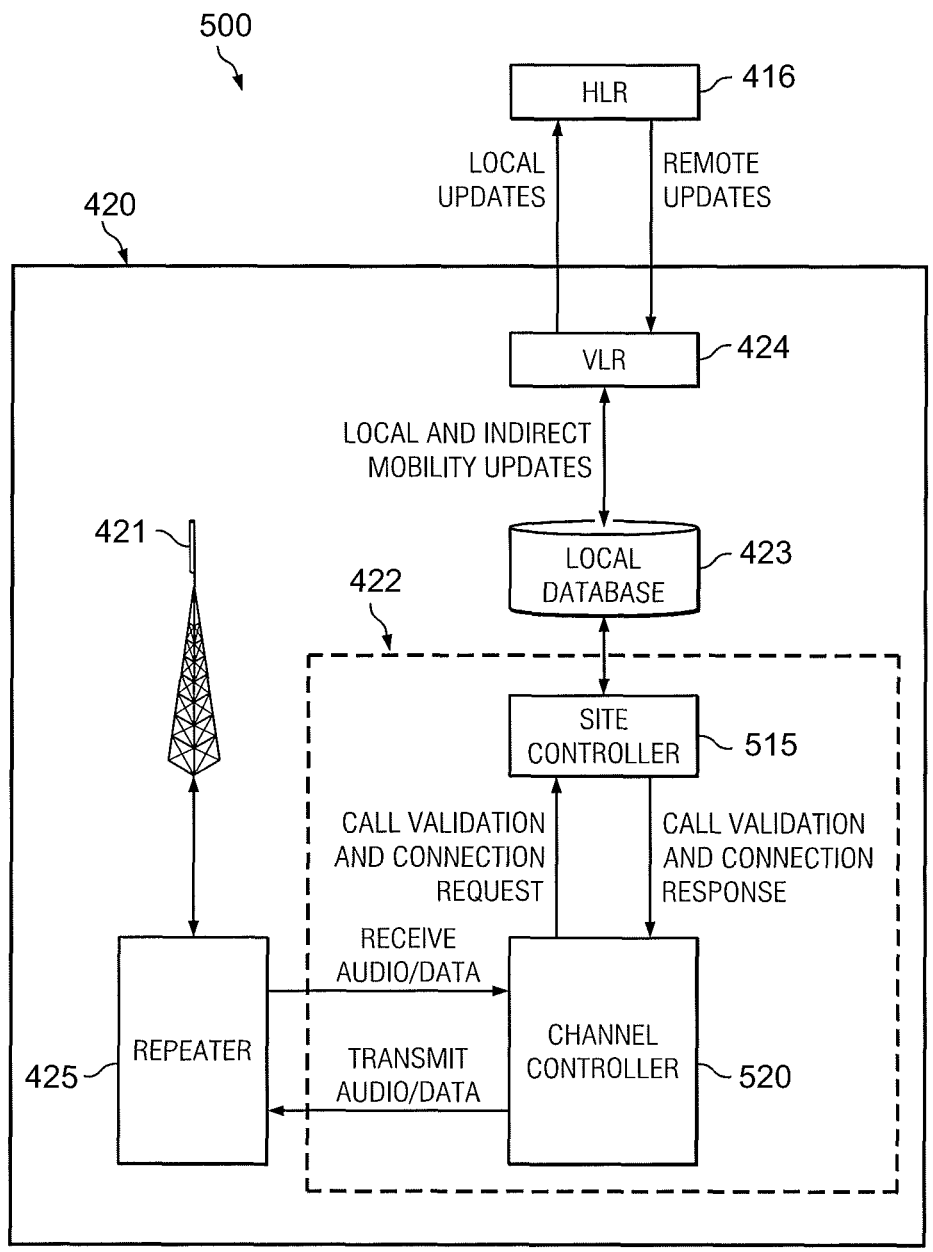
FIG. 5 is a more detailed illustration of a site provided by the system illustrated in FIG. 4.

FIG. 5 provides a more detailed illustration of an exemplary embodiment of a site 420 located within the system 400 shown in FIG. 4. The exemplary illustration 500 of FIG. 5 shows a local site 420 having a VLR 424, local database 423, site controller 422, repeater 425, and radio tower 421, wherein the site controller 422, in one embodiment, further comprises a site controller application 515 and a channel controller application 520. Among other things, the site controller application 515 is responsible for validation-checking of radios and user groups at the local site 420, and the channel controller application 520 is operable to control specific traffic channels to support communication with the repeater 425 to transmit and receive audio and data on a selected traffic channel. In FIG. 5, the VLR 424 and local database 423 are shown separate from the site controller 422 to maintain consistency with the system 400 shown in FIG. 4 even though, as previously mentioned, in some embodiments they may reside within the site controller 422.

Calls placed in the system 400 are typically handled within the site 420 in which the call originates, or is placed. As explained below, mobility management allows the system 400 to track the location and user group data of radios located within the system 400. The location and user group data is used by the system 400 to place calls between the radios and user groups. Typically there are two types of calls that may be placed, an individual call or a group call (otherwise referred to as "user group call"). An individual call originates from one radio and connects to one other radio, whereas a group call originates from one radio and connects to one or more radios that are members of the user group for which the call is placed. As used throughout the present disclosure, the term "interested radios" refers to radios that are members of a user group for which a specific call is placed. It should be understood that a radio may be designated as an interested radio regardless of whether the interested radio's local hybrid site 420 is a conventional site or a trunking site, even if the radio originating the call is located in a different type of hybrid site 420 (i.e., trunking or conventional).

Individual calls occurring between a source radio (i.e., the radio placing the call) and a destination radio (i.e., a radio receiving the call) may be classified as a local call or inter-site call, depending upon the location of the destination radio relative to the site 420 within which the call is originated. When the source radio places an individual call at a local site 420, the local channel controller application 520 may request a radio validation from the local site controller application 515. The local site controller application 515 then looks up both the source and destination radios in the local database 423 (or central database 414) to verify that the radios are registered with the system 400. Verification is then sent to the local channel controller application 520. If the call is valid (i.e., the source radio and destination radio are both registered with the system 400), the local channel controller application 520 may request a call connect from the local site controller application 515. If the source radio is not registered with the local site 420 but is configured with the system 400, the source radio's initiation of the call acts as a registration event, whereby the source radio is then registered with the local site 420.

Because databases 423 in the system 400 are assumed to be updated with the location and user group data for each radio in the system 400, in one embodiment, the local site controller application 515 may check the local database 423 to determine the destination radio's location. If the destination radio is located at the local site 420, then the call is classified as a local call, meaning the call will remain within the local site 420. However, if the destination radio is located in a remote site (not shown), then the call is classified as an inter-site call, meaning the call will be placed between the local site 420 and the remote site.

If the call is an inter-site call, the local site controller application 515 may contact the remote site's site controller application (not shown) to set up the call. The local channel controller application 520 then routes the call between the local site 420 and the remote site. As explained above, with respect to FIG. 3, if the local site 420 is a different type of hybrid site 420 than the remote site (e.g., the local site is a trunking site and the remote site is a conventional site), then the site controller 422 of the local site 420 packetizes voice signals originating from the originating radio into its appropriate site-type data packets (e.g., trunking site data packets)

and routes the local site-type data packets to the remote site controller. The remote site controller then routes the local site-type data packets to the destination radio. In an embodiment of the present disclosure, the radios may be configured to allow or disallow individual calls.

By providing radio location and user group data through the use of mobility management, the system 400 tracks not only the location of any radio registered with the system 400, but also which user groups are available to receive a call at each site 420. In an embodiment of the present disclosure, the system 400 dynamically routes group calls and allocates traffic channels based on the location of radios belonging to particular user groups within the system 400. This dynamic call routing and traffic channel allocation may be referred to herein as "user group zoning." For example, in accordance with FIG. 4, if a radio located at a site 420 (e.g. site 420A) places a call for a "Police" user group, the system 400 will check to see if other sites in the system 400 (e.g. sites 420B and 420C) contain radios that are members of the "Police" user group. As previously mentioned, the term "interested radio" refers to a radio belonging to a user group of a call that has been placed. If the "Police" user group is not a critical user group, then sites 420 containing interested radios (i.e., radios that are members of the "Police" user group) allocate traffic channels for the call; otherwise the site 420 ignores the call by not allocating traffic channels for the call. However, if the "Police" user group is designated as a critical user group, then traffic channels are allocated for the call at a site 420 regardless of whether the site 420 contains interested radios. In certain embodiments, user group zoning allows each site 420 in the system 400 to reserve RF resources by allocating traffic channels for a user group call if there are interested radios on the site 420. The details of user group zoning and group calls are described below.

When a group call is placed at a local site 420 in the system 400, the local channel controller application 520 may request a radio and user group validation from the local site controller application 515. The local site controller application 515 then looks up both the source radio and the user group in the local database 423 (or central database 414) to verify that the source radio is registered with the system 400 and that the user group is registered with the system 400 and enabled at the local site 420. Verification is then sent to the local channel controller application 520. If the call is valid (i.e., the source radio is registered with the system 400 and the user group is valid in the system 400 and enabled in the local site 420), the local channel controller application 520 will request a call connect from the local site controller application 515.

Since the local database 423 contains a listing of all radios, their location within the system 400, and their user group affiliation, and the user group data located in the local database 423 contains a listing of all sites in the system 400 that enable the user group of the call being placed and whether the user group is designated as normal or critical for each site 420 enabling the user group, the local site controller application 515 may determine if the call will remain local, or if it will need to connect an inter-site call with other sites 420 in the system 400. If an inter-site call is necessary, the local site controller application 515 may contact the remote site controller in each site participating in the call to set up the call. The local channel controller application 520 then routes the call between the local site 420 and each site 420 participating in the call as described above. The process for determining if a site may participate in a call is explained in greater detail below.

A site 420 may be determined to participate in a call based on the following criteria. If the site 420 is affiliated with the user group of the call, and the user group is designated as a normal user group for the site 420, then the site 420 may allocate traffic channels to participate in the call if the site 420 has an interested radio. However, when a user group is designated as critical for the site 420, the site 420 will always, in some embodiments, allocate resources for a call originating anywhere in the system 400 when the call is placed for the critical user group, even if the site 420 has no interested radios when the call is placed. The use of critical user groups allows for a radio belonging to a critical user group to move from one site 420 directly to another site 420 recognizing the user group as critical without dropping a call, even if there were no interested radios at the new site 420 when the call was placed. The possible additional bandwidth is reserved because of the "critical" nature and importance of the call and the need for added reliability.

A call that is already in process may be received at a new site 420 not currently allocating resources for the call if an interested radio moves to the new site 420 (regardless of whether the interested radio is participating in the call already in process), or a radio already on the new site 420 provides a mobility update to the system 400, wherein the mobility update includes the user group for the call currently in process. When this occurs, the site 420 may allocate resources (if available) for the call, thereby allowing the radio to continue the call uninterrupted. Accordingly, a call requiring resources to be allocated dynamically at a new site 420 as just described is assumed to be a normal group call since a critical group call would already have resources allocated at the new site 420.

Mobility management may be provided to radios operating on trunking sites 420 located in the hybrid system 400 using methods that are currently known in the art. Such methods may include, for example, communication between the radio and its trunking site 420 by sending periodic messages to and from radios operating on the trunking site 420 through the trunking site's control channel (see FIG. 3). Since conventional sites lack the control channel that is provided in trunking sites to support mobility management, mobility management is provided by the conventional sites 420 located in the hybrid system 400 using a method that is different than that used to provide mobility management in the trunking sites 420.

To support mobility management in the conventional sites 420, data is transmitted to and from each radio registered with the system 400 and located at a conventional site 420 when the current traffic channel of the radio is idle. This data may include a mobility update, a status message, or any other data communicated between the radio and components within the system 400. In one embodiment of the present disclosure, the system 400 sends periodic data packets at selected intervals (e.g., every two minutes) to each radio located at a conventional site 420 within the system 400. Alternatively, the periodic data packets may be sent when no voice or data traffic has been detected on a radio's traffic channel for the selected time interval. Receipt of any data or voice communication by the radio confirms to the radio that it is within coverage of the system 400. However, if the radio fails to receive any data or voice communication within a given period of time (e.g., 5 minutes), the radio assumes that it is no longer within coverage of the system 400. Accordingly, the radio may be programmed to provide an "out-of-coverage" indication to alert the radio operator that the radio is no longer within coverage of the system 400. The out-of-coverage indication may include any combination of an audible, visual, and/or physical indication. The out-of-coverage indication may continue for a selected amount of time, or until data or voice communication is received by the radio, thereby indicating that the radio is within coverage of the system 400.

Radios operating within the system 400 may also be configured to support channel and/or user group scanning (otherwise referred to herein as "radio scanning"). Radio scanning allows radios to listen for activity on a number of preconfigured channels and/or user groups while the radio's current traffic channel is idle. It should be noted that during radio scanning, the radio's current traffic channel and user group are not changed; therefore, if communication is initiated by the radio during the radio scan, and the communication is not in response to channel activity on one of the scanned channels/user groups, the radio uses its currently-selected traffic channel and user group. However, if during the scan, communication is initiated by the radio in response to activity on one of the scanned channels/user groups, the radio, in one embodiment, will temporarily switch its transmitter to the scanned channel/user group so the communication will be transmitted to/from the channel/user group on which the activity was detected. After a period of inactivity on the channel/user group on which the activity was detected, the radio may revert back to its original traffic channel and user group and continue scanning.

Because radios may scan multiple user groups, a single radio may be considered an interested radio for more than one user group or group call (when the radio is scanning). Therefore, if a radio is already participating in a group call, the radio may choose to ignore a new group call detected on its scanning channels/user groups if the new group call is of a lower priority than the group call in which the radio is already participating.

In certain embodiments, the system 400 may be able to perform several functions over the air with respect to activity of a specific radio. For example, the system 400 may be able to verify over the air whether or not a radio is operational (i.e., on, functional, and within coverage) by sending a "radio check" command, and the system 400 may be able to disable or enable communication of a specific radio by sending a "radio inhibit/uninhibit" command. When a radio check command is requested, the NMS 412 may send the command to various VLRs 424 in the system 400. The VLRs forward the command to each local site 420 for transmission over the air to the radio. The radio may respond with a "Radio Check Acknowledged" signal sent to the radio's local VLR 424, which forwards the response to the HLR 416. The HLR 416 updates the central database 414 with the response. Receipt of the radio check acknowledged signal confirms to the system 400 that the radio is, indeed, operational.

The system 400 is capable of disabling an enabled radio by requesting a radio inhibit command. When a radio inhibit command is requested, the NMS 412 sends a radio inhibit control message to various VLRs 424 in the system 400. Each VLR 424 forwards the radio inhibit control message to its respective local site 420. Each site 420 then transmits the radio inhibit control message until a "radio inhibit complete" control message is received by the site's local VLR 424. The radio inhibit control message is transmitted by the site 420 to the radio addressed by the control message. Once received, the radio sends a "radio inhibit acknowledged" message to its local site 420, which sends a radio inhibit complete message to the local VLR 424. The VLR 424 forwards the radio inhibit complete message to the HLR 416, which propagates the message to various VLRs 424 in the system 400. When a VLR 424 receives a radio inhibit complete message, it will send a request to its local site 420 to stop transmitting the radio inhibit control message.

The system 400 is also capable of enabling a disabled radio by sending a radio uninhibit control message to the disabled radio. When a radio uninhibit command is requested, the NMS 412 sends a radio uninhibit control message to various VLRs 424 in the system 400. Each VLR 424 forwards the radio uninhibit control message to its respective local site 420. Each site 420 then transmits the radio uninhibit control message until a "radio uninhibit complete" control message is received by the site's local VLR 424. The radio uninhibit control message is transmitted by the site 420 to the disabled radio addressed by the control message. Once received, the radio is enabled and sends a "radio uninhibit acknowledged" message to its local site 420, which sends a radio uninhibit complete message to the local VLR 424. The VLR 424 forwards the radio uninhibit complete message to the HLR 416, which propagates the message to various VLRs 424 in the system 400. When a VLR 424 receives a radio uninhibit complete message, it sends a request to its local site 420 to stop transmitting the radio uninhibit control message.

Mobility management, in some embodiments, allows the system 400 to track the location of a radio, when the radio accesses the system 400 from any site 420, by receiving from the radio, in some embodiments, time-stamped location and/or user group data packets known as "mobility updates." For radios located at a conventional site 420, transmission of the mobility updates may occur once the radio detects that its current traffic channel is idle. For radios located at a trunking site 420, transmission of a mobility update occurs through the control channel. The term "mobility update" may be used throughout the present disclosure to refer to the time-stamped data packets containing radio location and/or user group data, whereas the term "mobility update event" may be used to refer to the act of sending and/or receiving a new mobility update between components of the system 400. Additionally, the term "local mobility update event" refers to a mobility update event originating within a local site 420, whereas the term "remote mobility update event" refers to a mobility update event originating outside the local site 420. In local mobility update events, mobility updates may be pushed to the HLR 416 from the VLR 424 of the local site 420 for distribution to the rest of the system 400, whereas in remote mobility update events, mobility updates may be pushed down to the VLR 424 of the local site 420 by the HLR 416. For simplicity, mobility updates are described herein as having "location and user group data;" however, it should be appreciated that although mobility updates typically include both location and user group data, in some embodiments, the mobility update may not include one of the location data or the user group data.

The location and user group data provided in a mobility update may be stored in multiple components of the system 400. For example, the location and user group data may be stored in the central database 414 and/or local databases 423. In some embodiments, the location and user group data may even be stored in an internal memory or register located in the HLR 416 and VLRs 424. In accordance with the present disclosure, when reference is made to knowledge of a radio's location and user group data by the system 400, it should be understood that the data may be stored in multiple locations within the system 400 as described above.

In an embodiment of the present disclosure, local mobility update events may trigger the local VLR 424 to push the mobility updates to the HLR 416 when the mobility update indicates a change in the location, such as movement from one site 420 to another site 420, or a change in the user group data of the radio initiating the mobility update. Remote mobility updates received at the HLR 416, from other VLRs 424 in the system 400, may trigger the HLR 416 to push the mobility updates down to the local VLR 424, which updates the local database 423. Mobility update events are described in greater detail below.

Mobility update events may be initiated in response to a registration event occurring at a site 420, or in response to radio activities such as, for example, initiating a "Request-to-Talk" (RTT), emergency alarm transmission, status message transmission, and "Push-to-Talk" (PTT). These radio activities are referred to as implicit registration events because operation of the event may indicate that the radio is registered with the site 420; however, if the radio is not registered, the implicit registration event may trigger the registration of the radio with the site 420 if the radio is configured with the system 400.

In general, a mobility update event may be initiated by a radio when there is a change in the radio's location or user group data, or if the radio incurs a power-on/off, change of channel, RTT, emergency alarm transmission, status message transmission, PTT, or other events that result in a change to the operation or status of the radio. Additionally, it should be appreciated that a mobility update event may be initiated in response to events other than those provided herein, and therefore, may be initiated not only by the radio itself, but also by components within the system 400. For example, a dispatch console 440 may command a site 420 to request mobility updates from all radios located at the site 420.

Figure 6:
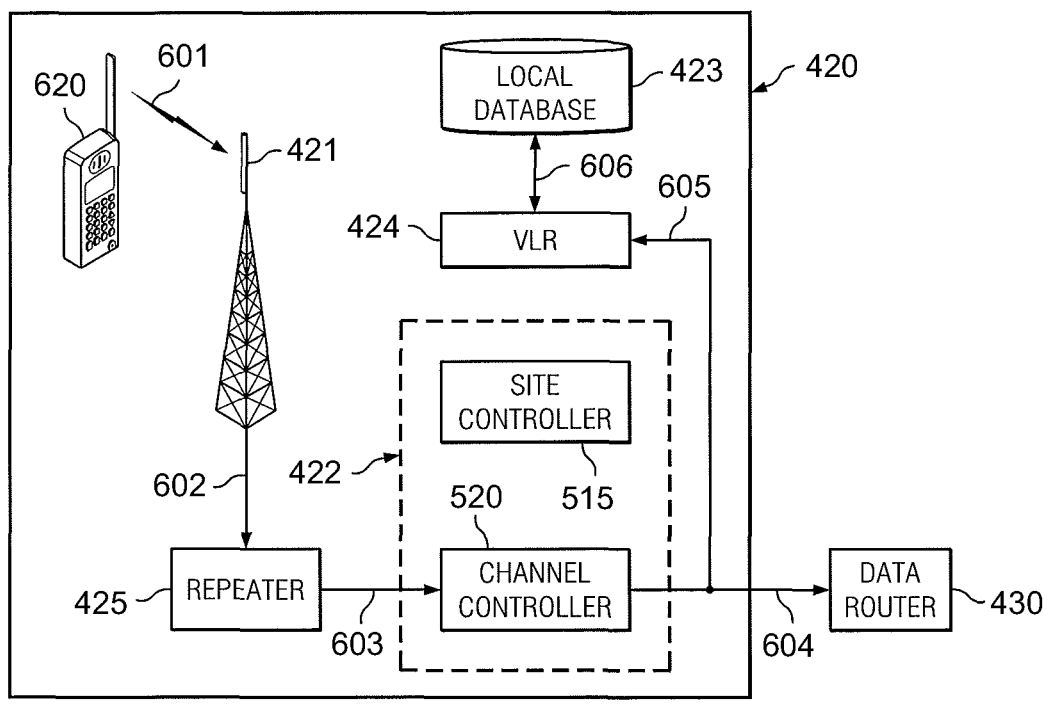
FIG. 6 illustrates the steps and components involved in an exemplary initial check of a mobility update event occurring within a local site.

As described above, local mobility update events take place within a local site 420 upon occurrence of any one of several events (i.e., radio enters coverage of the site 420, radio powers on or off, radio channel is changed, etc). In some embodiments, when a local mobility update event occurs, an initial check is performed at the local site 420 to determine whether the mobility update contains a change in the location or user group data already known for the radio initiating the local mobility update event. FIG. 6 illustrates an initial local mobility update event check process 600.

In step 601, a radio 620 initiates a local mobility update event. If the local site 420 is a conventional site, then the local mobility update event is initiated by transmitting a mobility update across a traffic channel when the traffic channel is idle. If the local site 420 is a trunking site, then the local mobility update event is initiated by transmitting the mobility update through the control channel. The mobility update is received by the radio tower 421 and transmitted to the repeater 425 in step 602. In step 603, the repeater 425 transmits the mobility update to the channel controller application 520. The channel controller application 520 transmits the mobility update to the data router 430 and VLR 424 in steps 604 and 605, respectively. Although steps 604 and 605 are shown separately in FIG. 6, it should be understood that these steps may occur simultaneously as a single event. In step 606, the VLR 424 updates the local database 423 with the radio 620 user group data (e.g. user group affiliation) and location data (e.g., site affiliation data) contained in the mobility update. In the present embodiment, the location and user group data of the radio 620 is stored in the local database 423. If the pre-existing data in the local database 423 matches the data contained in the mobility update, then the initial check process 600 ends here since there has been no change to the radio's location or user group data. However, if the mobility update contains different radio location or user group data, then the local site 420 will push the mobility update up to the rest of the system 400 as explained below and illustrated in FIG. 7.

Figure 7:
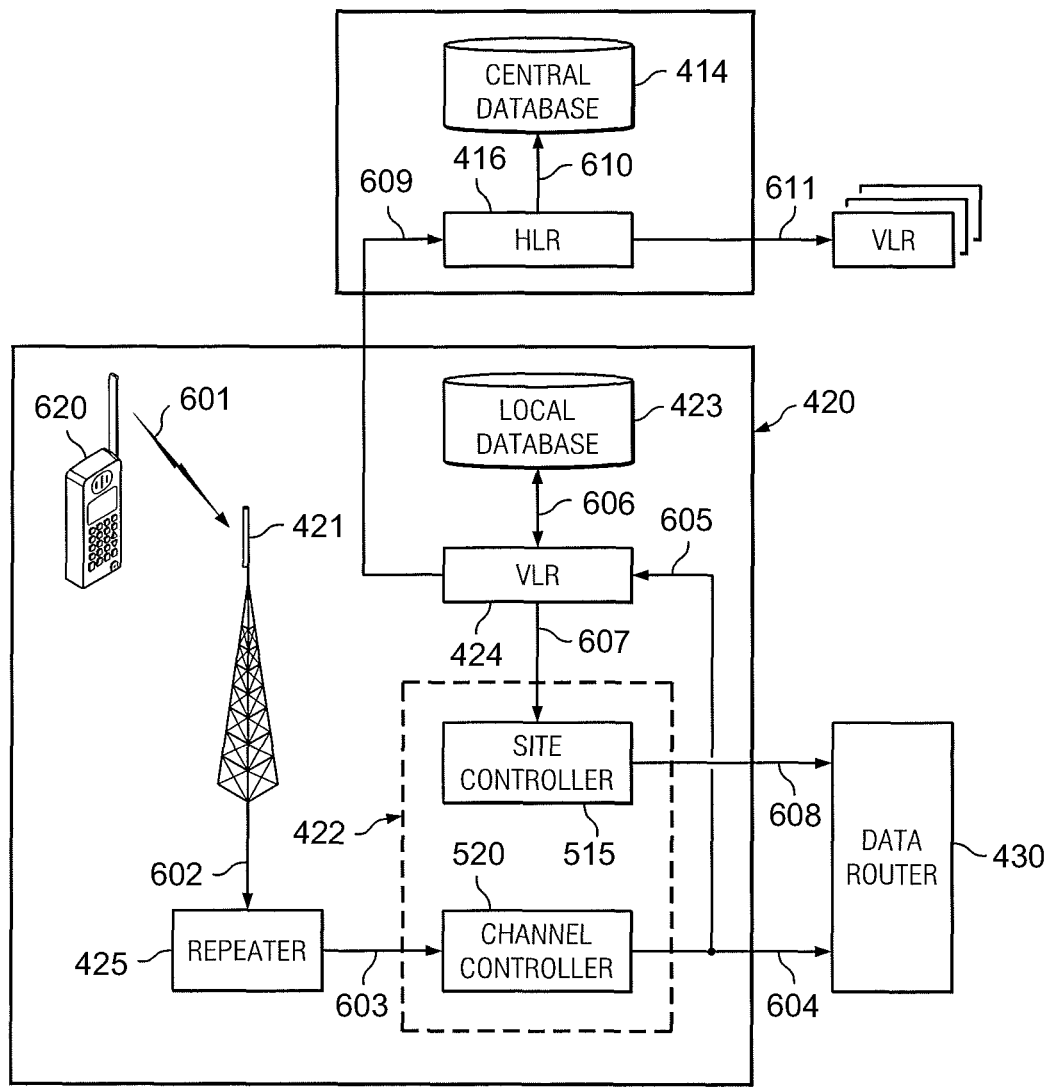
FIG. 7 is an updated version of FIG. 6 illustrating the steps and components involved in an exemplary mobility update event after it has been determined that the mobility update is to be pushed to the rest of the system.

FIG. 7 is an updated version of FIG. 6 illustrating the steps and components of FIG. 6 as well as the steps and components involved in an exemplary mobility update event after it has been determined that the mobility update contains new location or user group data, and therefore is to be pushed to the rest of the system 400. After updating the local database 423 with the new location and/or user group data as described above, the VLR 424 sends a command to the site controller application 515 to send the location data contained in the mobility update to the data router 430 in steps 607 and 608. The VLR 424 then pushes the mobility update to the HLR 416 in step 609. Upon receipt of the mobility update, the HLR 416 updates the central database 414 with the mobility update in step 610. In step 611, the HLR 416 pushes the mobility update to other VLRs in the system 400. Although it is not illustrated in FIG. 7, upon receipt of the mobility update, the other VLRs in the system 400 update their respective local databases with the mobility update. It should be noted that, with respect to the VLRs in the other sites, this mobility update event would be considered a remote mobility update event since it originated from another site. Updating all respective local databases 423 in response to the mobility update event ensures that all databases 423 within the system 400, the central database 414, and the data router 430 are updated with the mobility update from the radio 620 initiating the mobility update event.

Although it is not illustrated in FIGS. 4-7, in some embodiments, upon receiving a mobility update, the HLR 416 may push the mobility update to all VLRs 423 in the system 400, including the local VLR 423 originally providing the mobility update to the HLR 416. In this embodiment, the local VLR 423 may not send a command to its local site controller application 515 to send the location data to the data router 430 until after it receives the mobility update from the HLR 416.

In an example in accordance with the embodiments illustrated in FIGS. 4-7, if a radio 620 is powered on within range (coverage) of site 420A, the radio 620 initiates a mobility update event—in this case, the mobility update could be initiated by a registration event resulting from the power-on of the radio 620. It should be noted that this registration event prompts the site controller application 515A to validate the radio 620 and its user group. If the local site 420A is a conventional site, the radio 620 monitors its current traffic channel for activity and transmits the mobility update through the radio tower 421A to the router 425A when the traffic channel is idle. If the local site 420A is a trunking site, the radio 620 transmits the mobility update to the radio tower 421A through the local site's control channel. The router 425A then sends the mobility update to the channel controller application 520A, which sends the mobility update to the VLR 424A and data router 430. The VLR 424A then stores the mobility update in the local database 423A. With respect to site 420A, the initiation of the mobility update is considered a local mobility update event.

If the mobility update provides new location or user group data, the VLR 424A sends a command to the site controller application 515A to send a data registration packet to the data router 430. The VLR 424A then pushes the mobility update to the HLR 416 where it is stored in the central database 414. The HLR 416 then pushes the mobility updates to VLRs 424B and 424C. Upon receipt of the mobility update, the VLRs 424B and 424C then store the mobility update in local databases 423B and 423C, respectively. With respect to sites 420B and 420C, receipt and storage of the mobility update is considered a remote mobility update event since the mobility update originated from site 420A. Accordingly, local databases 423A, 423B and 423C, and central database 414 contain the mobility updates and, thus, are up-to-date.

In one implementation, a site 420 may send periodic information packets to the NMS 412, to which the NMS 412 replies with an acknowledgement confirmed or failed signal thereby indicating whether or not a proper connection exists between the site 420 and the home location 410. Consequently, both the site 420 and the NMS 412, and thus, the home location 410, may detect loss of a connection. Additionally, when a VLR 424 and the HLR 416 communicate, each provides confirmation, or acknowledgement, that communication was received. Thus, a site 420 may determine that the HLR 416 is nonresponsive, or down, when the VLR 424 fails to receive confirmation from the HLR 416; and the HLR 416 may determine that the VLR 424 is nonresponsive when the HLR 416 fails to receive confirmation from the VLR 424. Accordingly, two communication error conditions may exist: 1) the HLR 416 is down, and thus, is disconnected from (and unable to communicate with) all VLRs 424 in the system 400; and 2) a VLR 424 is down, and thus, is unable to communicate with the HLR 416 and other VLRs 424. If a connection between a site 420 and the home location 410 is lost, each disconnected site 420 may operate using its respective local database 423 in a stand-alone mode as described below.

In the first condition, wherein the HLR 416 is down and is unable to communicate with all VLRs 424 in the system 400, a VLR 424 may send mobility updates directly to other VLRs 424 within the system 400 for storage in their respective local databases 423 by sending a multicast mobility update. For example, in accordance with FIG. 4, if a local mobility update event occurs at site 420A, and the VLR 424A is unable to communicate with the HLR 416, the VLR 424A may transmit the mobility update directly to VLRs 424B and 424C for storage in local databases 423B and 423C.

Once the HLR 416 is reconnected with the VLRs 424, a synchronization process between reconnected VLRs 424 and the HLR 416 may occur, wherein the central database 414 is updated with the mobility updates stored in the local databases 423 of the reconnected VLRs 424. Because the mobility updates are time-stamped, the system 400 may confirm that the most recent mobility updates are stored in all databases (local databases 423 and central database 414) within the system 400.

In accordance with the second condition, wherein a VLR 424 is down and is disconnected from the HLR 416 and other VLRs 424, if the HLR 416 is aware of the existence of the disconnected VLR 424, mobility updates, which may include radio data such as radio location data or radio user group data, received from other connected VLRs 424 may be queued in the HLR 416 until communication is reestablished with the disconnected VLR 424. Once communication is reestablished, the mobility updates are pushed to the reconnected VLR 424. If the HLR 416 is unaware of the disconnected VLR 424, upon connection, the local database 423 of the previously disconnected VLR 424 may be synchronized with the mobility updates of the central database 414.

It should be appreciated by those of ordinary skill in the art, that certain components of the system 400 may be integrated with others without departing from the scope of the application as set forth in the claims below. For example, the home location 410 may not include a separate central database 414. As such, information that is disclosed as being stored in the central database 414, may alternatively be stored in an onboard memory or register located in the HLR 416. Additionally, certain components, modules and functions may be integrated into one unit or separate. For example, in some embodiments, the data router 430 may be combined with the HLR 414.

Figure 8:
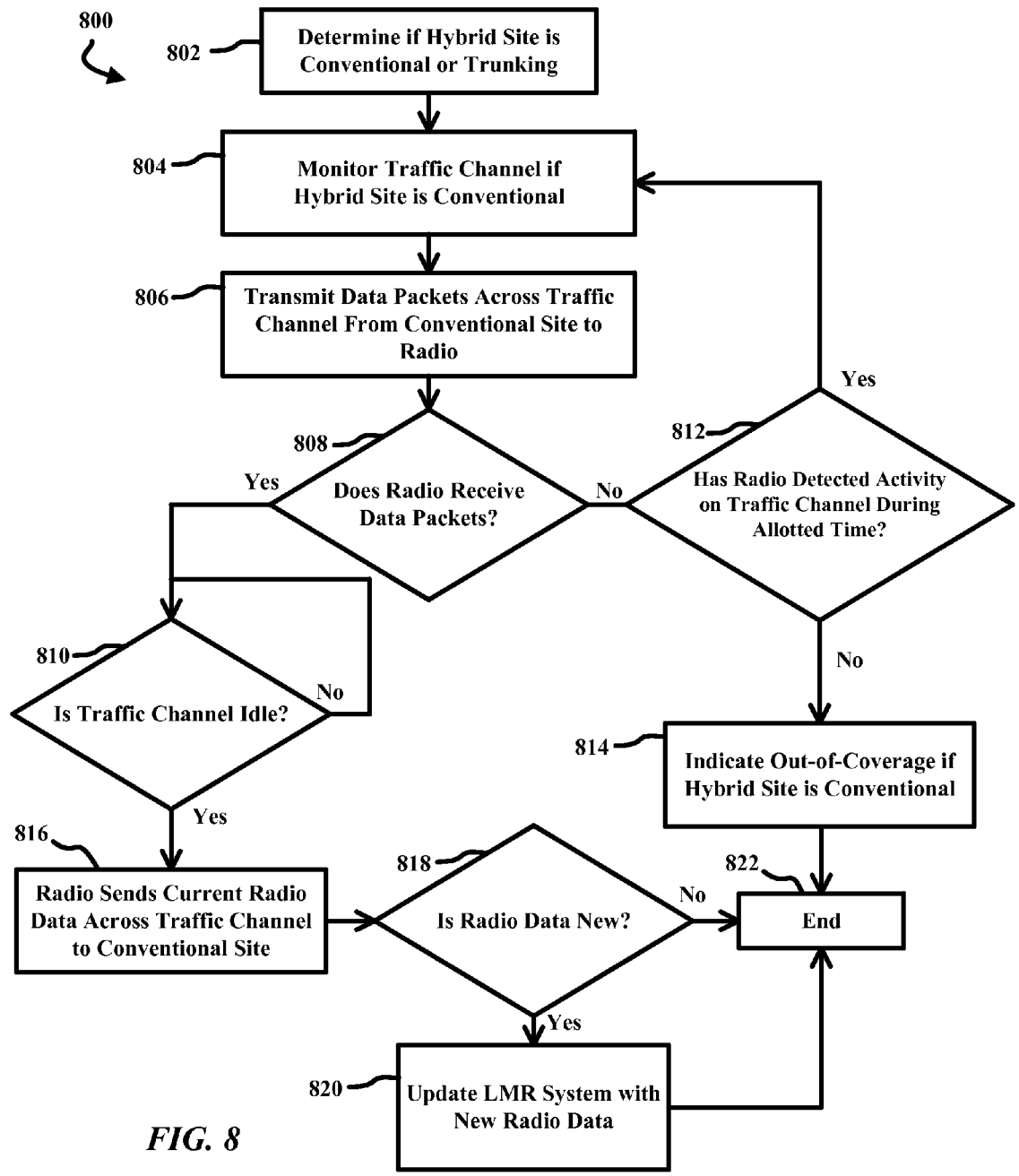
FIG. 8 illustrates an example embodiment of a method for providing mobility management and out-of-coverage indication in a hybrid land mobile radio system when a radio is in communication with a conventional site in the hybrid LMR system.

FIG. 8 is provided as a general description of one example embodiment for providing mobility management and out-of-coverage indication in a hybrid land mobile radio system when a radio is in communication with a conventional site in the hybrid LMR system. The operations provided in this embodiment may be performed by various components within the LMR system. A flowchart 800 is shown in FIG. 8, wherein one iteration of the method starts at 802 wherein a radio is determined to be in communication with, or located at, either a conventional site or a trunking site in the hybrid LMR system. At 804, a traffic channel is monitored if the site is a conventional site. At 806, data packets are transmitted across the traffic channel from the conventional site to the radio. If the radio receives the data packets at 808, then at 810 the radio determines if the traffic channel is idle. However, if the radio does not receive the data packets at 808, then at 812 the radio determines if it has detected activity on the traffic channel during an allotted period of time. It should be appreciated that determining if the radio has detected activity on the traffic channel during an allotted amount time may be performed at any time and regardless of whether or not the radio receives the data packets; however, in the event that the radio does receive the data packets, the determination at 812 may be unnecessary in certain implementations. If the radio has detected activity (e.g., receipt of voice or data communication) on the traffic channel within the allotted amount of time, then the iteration ends or restarts and the radio continues to monitor the traffic channel; otherwise, the radio indicates that it is out-of-coverage at 814 if the site is a conventional site.

If the radio receives the data packets at 808, the radio waits until the traffic channel is idle before sending current radio data (e.g., current location data and user group data) across the traffic channel to the conventional site at 816. As previously stated, in some embodiments, location data may be the site to which the radio is communicating, or coordinate data such as that provided by a Global Positioning System (GPS). If the radio data such as, for example, either the radio location data or the radio user group data sent to the LMR site, is determined to be new (i.e., different than what was previously stored for the radio in the LMR system) at 818, then the hybrid LMR system is updated with the new radio data (e.g., new location data and/or user group data) at 820; otherwise, the iteration ends (or starts over) at 822.

What is claimed is:

1. A method for providing mobility management and out-of-coverage indication in a hybrid land mobile radio system that includes a conventional land mobile radio site and a trunking land mobile radio site, the method comprising:
    monitoring a traffic channel of the conventional land mobile radio site of the hybrid land mobile radio system;
    communicating, over the traffic channel, data packets between the conventional land mobile radio site and a radio, wherein receipt of the data packets indicates that the radio is within coverage of the hybrid land mobile radio system;
    communicating, over the traffic channel, radio data between the radio and the conventional land mobile radio site when the traffic channel is idle; and
    indicating that the radio is out-of-coverage if communication between the radio and the conventional land mobile radio site is not detected on the traffic channel for an allotted amount of time.

2. The method as set forth in claim 1, further comprising:
    communicating, over a control channel, data packets between the trunking land mobile radio site and a second radio;
    communicating, over the control channel, radio data from the second radio to the trunking land mobile radio site; and indicating that the second radio is out-of-coverage when the second radio is outside of coverage of the hybrid land mobile radio system.

3. The method as set forth in claim 1, wherein the radio data comprises at least one of radio location data and radio user group data.

4. The method as set forth in claim 1, further comprising updating the hybrid land mobile radio system with the radio data.

5. The method as set forth in claim 4, wherein the radio data is updated if the radio data is different than previously-known radio data.

6. The method as set forth in claim 4, wherein updating the hybrid land mobile radio system with the radio data comprises:
   storing the radio data at a location associated with the conventional or trunking land mobile radio site; and
   routing the radio data to other land mobile radio sites in the system.

7. The method as set forth in claim 4, wherein updating the hybrid land mobile radio system with the radio data comprises:
   storing the radio data at a location associated with the conventional or trunking land mobile radio site;
   routing the radio data to a home location site; and
   transmitting the radio data from the home location site to at least one other land mobile radio site in the system.

8. The method as set forth in claim 7, wherein updating the hybrid land mobile radio system with the radio data further comprises storing the radio data in a location associated with the at least one other land mobile radio site.

9. The method as set forth in claim 1, wherein indicating that the radio is out-of-coverage includes at least one of an audible indication, a physical indication, or a visual indication at the radio.

10. The method as set forth in claim 1, wherein detecting communication on the traffic channel comprises detecting at least one of audio communication or data communication on the traffic channel.

11. The method as set forth in claim 1, further comprising:
   initiating a call from the radio, wherein the radio is affiliated with a user group and is in communication with the conventional or trunking land mobile radio site; and
   allocating one or more traffic channel resources at a second land mobile radio site enabling the user group.

12. A system for providing mobility management and out-of-coverage indication in a hybrid land mobile radio system, the system comprising:
   one or more conventional land mobile radio sites comprising the hybrid land mobile radio system;
   one or more trunking land mobile radio sites comprising the hybrid land mobile radio system; and
   a radio operable to communicate with at least one of the one or more conventional land mobile radio sites or trunking land mobile radio sites over a traffic channel, and to indicate the radio is out-of-coverage of the hybrid land mobile radio system if the radio does not detect activity on the traffic channel for an allotted amount of time.

13. The system as set forth in claim 12, wherein the radio is further operable to monitor the traffic channel for activity and transmit radio data to the at least one of the one or more conventional land mobile radio sites when the traffic channel is idle.

14. The system as set forth in claim 13, wherein the radio detects activity on the traffic channel by receiving at least one of audio communication or data communication on the traffic channel.

15. The system as set forth in claim 13, wherein the radio is further operable to transmit radio data to a trunking land mobile radio site through a control channel.

16. The system as set forth in claim 13, wherein the radio data comprises at least one of radio location data or radio user group data.

17. The system as set forth in claim 12, wherein indicating that the radio is out-of-coverage includes at least one of an audible indication, a physical indication, or a visual indication at the radio.

18. A method for providing communication between a radio and at least one of a conventional land mobile radio site and a trunking land mobile radio site comprising a hybrid land mobile radio system, the method comprising:
   monitoring a traffic channel of the conventional land mobile radio site of the hybrid land mobile radio system;
   communicating data packets between the radio and the conventional land mobile radio site of the hybrid land mobile radio system, wherein receipt of the data packets indicates that the radio is within coverage of the hybrid land mobile radio system; and
   indicating that the radio is out-of-coverage of the hybrid land mobile radio system if activity is not detected on the traffic channel for an allotted amount of time.

19. The method as set forth in claim 18, further comprising communicating radio data across the traffic channel when the traffic channel is idle.

20. The method as set forth in claim 19, wherein the radio data comprises at least one of radio location data and radio user group data.

21. The method as set forth in claim 18, wherein detecting activity on the traffic channel includes detecting at least one of audio communication or data communication on the traffic channel.

22. The method as set forth in claim 18, wherein indicating that the radio is out-of-coverage includes providing at least one of an audible indication, a physical indication, or a visual indication at the radio.

* * * * *